United States Patent [19]

Buus

[11] Patent Number: 4,827,734
[45] Date of Patent: May 9, 1989

[54] CYLINDRICAL FREEZING DRUM FOR SLICE ICE MAKING MACHINES AND A METHOD OF PRODUCING THE DRUM

[75] Inventor: Peter Buus, Maalov, Denmark

[73] Assignee: Aktieselskabet Thomas Ths. Sabroe & Co., Hojbjerg, Denmark

[21] Appl. No.: 937,020

[22] Filed: Dec. 2, 1986

[30] Foreign Application Priority Data

Feb. 12, 1985 [CA] Canada ................................ 496659

[51] Int. Cl.⁴ .............................................. F25C 1/14
[52] U.S. Cl. ...................................... 62/354; 165/133; 427/37
[58] Field of Search ................... 62/354, 346; 427/37; 219/76.14; 165/133

[56] References Cited

U.S. PATENT DOCUMENTS

| | | | |
|---|---|---|---|
| 2,549,215 | 4/1951 | Mansted | 62/346 |
| 3,973,918 | 8/1976 | Tidwell | 165/133 X |
| 4,269,867 | 5/1981 | Altorfer et al. | 427/37 |
| 4,302,483 | 11/1981 | Altorfer et al. | 427/37 |
| 4,396,473 | 8/1983 | Hughes et al. | 427/37 X |
| 4,547,391 | 10/1985 | Jenkins | 427/37 |

*Primary Examiner*—William E. Tapolcai
*Attorney, Agent, or Firm*—Antonelli, Terry & Wands

[57] ABSTRACT

A cylindrical freezing drum for a slice ice making machine and method of producing the freezing drum. The freezing drum is supplied with a freezing medium to one side of a drum wall and with a water to an opposite side thereof and cooperates with a scrapper arrangement for successively scrapping off the ice produced on the drum, with the drum being made of steel and provided with an exterior metallic coating. The metallic coating is an aluminum coating applied by an arc spray method. At least one cylindrical side of the steel drum is provided with a corrosion protective metallic coating by applying to the drum surface a layer of aluminum and thereafter turning the drum surface to an accurate cylindrical shape.

3 Claims, 1 Drawing Sheet

CYLINDRICAL FREEZING DRUM FOR SLICE ICE MAKING MACHINES AND A METHOD OF PRODUCING THE DRUM

The present invention relates to slice ice production machines of a type disclosed in, for example, commonly assigned U.S. application Ser. No. 884,229, now U.S. Pat. No. 4,700,551; with the ice production machine comprising a cylindrical freezing drum, which is connected with a refrigeration system for supplying a freezing medium to one surface of the drum wall, while means are provided for supplying water to the opposite surface of the freezing drum wall, such that the supplied water is frozen thereon by the action of said freezing medium, and scrapper means are provided for successively scraping off ice as hereby produced on the freezing. The active drum surface of the freezing drum on which the ice is produced may be an interior or exterior side of the freezing drum wall, and the ice scrapping motion may be effected by rotating either the freezing drum or the scrapper means about an axis of the drum cylinder.

More particularly the present invention relates to the character of the active surface of the freezing drum. Traditionally the freezing drum is made of a low alloyed steel material which is coated by a chromium plating, which is hard enough to resist the forces encountered by the mechanical scraping off of the ice and which serves additionally to protect the steel freezing drum from corrosive attacks by the water, which is not always a chemically clean water product, inasfar as the water may well contain aggressive salts, e.g. when originating from sea water.

It has been found that an ordinary hard chromium plating of the active surface of the freezing drum as used conventionally is in fact not sufficient to protect the basic freezing drum material against corrosion, because the plating shows microscopic pores through which the surface. In particular it is the contents of chlorides in the water which is responsible for corrosion attacks on the passivating surface film on the chromium plating, whereafter the said pores are created by further corrosion. Many attempts have been made to provide for an improved coating, but so far without practical results.

It has even been proposed to manufacture the freezing drum from a stainless steel material, but this is an expensive solution which even involves the drawback that known stainless materials have a relatively low heat or cold transfer capacity.

It is the object of the invention to provide an improved freezing drum for the above-described purpose which shows an advantageous combination of properties with respect to price, corrosion resistance, cold transfer capacity and mechanical strength. The invention has come up as a surprising result of the use of coating material, namely, aluminum, which should not, beforehand, be believed suitable at all. The yield strength of technically pure aluminum is practically the same as the strength of ice, and it should not be expected, therefore, that aluminum would be usable at all. However, practice has shown that a coating is very firmly bonded to the basic steel freezing drum surface.

DETAILED DESCRIPTION

Figure 1:
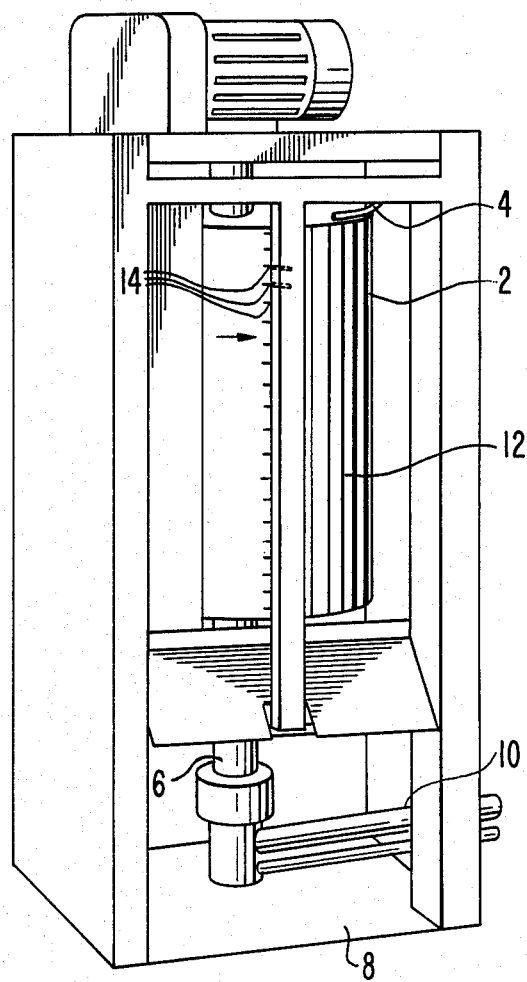
FIG. 1 is a schematic perspective view of a slice ice machine.

Referring now to the drawings wherein like reference numerals are used throughout the various views to designate like parts, and, more particularly, to FIG. 1, a slice ice making machine of the type disclosed in, for example, U.S. Pat. No. 4,700,557 includes a chassis and a smooth freezing drum 2 which is mounted in the chassis for rotation about a vertical axis driven by a motor disposed at the top end of the chassis. A stationary nozzle tube is provided above the freezing drum 2 from which water is caused to run down along the smooth surface of the drum freezing 2, with the water supply taking place over a majority of the periphery of the freezing drum. The freezing drum 2 is supported by a lower bearing 6, through which the freezing drum is connected with a supply pipe 8 for a refrigerant and a suction pipe 10 for the same refrigerant. A vertical scrapper knife bar 12 is mounted at the front side of the slice ice machine, with the knife bar 12 including a plurality of inwardly protruding scapper knives 14 extending almost horizontally such that the knives successively scrape off ice formed on the freezing drum surface, with the rigid knives 14 producing a vertical displacement of the ice which is thereby loosened from the freezing drum surface so as to fall down as sliced ice. A lower inclined plate member 16 serves to receive the falling ice and guide the ice outwardly to a receiver box or conveyor in front of the machine.

Figure 2:
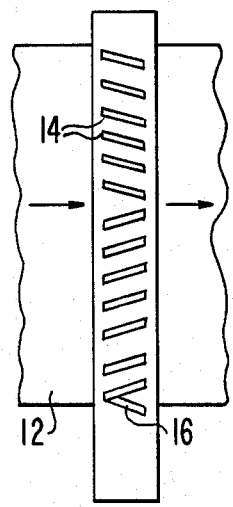
FIG. 2 is a detailed view of a knife bar of the slice ice machine of the present invention.

As shown in FIG. 2, at least approximately half of the number of the knives 14 may be mounted so as to be oppositely or upwardly inclined, whereby an essential reduction of the total force acting upon the knife bar 12 and the freezing drum surface respectively will be achieved, that is, the chassis and holding means of the knife bar 12 may be designed so as to be less heavy.

In accordance with the present invention, the smooth basic steel drum surface is coated by a layer of aluminum which is applied by a known elcetric arc spraying process which ensures a very firm bonding between the base layer and the coating, without the base layer having to be considerably heated, i.e., without the basic drum member having to be treated to such a degree that the steel material thereof gets softened.

In practice the electric arc spraying process is carried out by establishing an electric arc between adjacent ends of a pair of aluminum wires, whereby the aluminum is melted in the arc area, and the melted material, at its associated high temperature, is blown against the surface to be coated by one or more blowing nozzles directing an air flow towards the surface through the area of the electric arc. The temperature of the electric arc is some 6000° C., i.e. the blown-on material may hereby be very warm, whereby a safe adherance is obtainable even though the receiving basic surface has not been preheated.

A fully sufficient bonding of the aluminum coating on the steel surface by this method is achievable without special precautions other than according to common standards. Accordingly the steel surface should be preadapted by degreasing, sand blasting with sharp sand, brushing and vacuum cleaning prior to the electric arc process. Preferably, the aluminum should be applied with a layer thickness of some 0.8–1 mm, and the freezing drum 2 should subsequently be lathed to a full cylindrical shape whereby the remaining aluminum coating should have a thickness of at least 0.2 mm.

In the conventional production of the drum of the aforementioned type, it has been normal practice to machine the steel drum surface in order to secure a practically exactly circular cylindrical surface of the freezing drum, 2 which is important for the correct or optimal operation of the ice machine, because the scraper means should be arranged quite close to the drum surface. By such machining, however, internal stresses in the welded drum structure will often give rise to some irregularity of the roundness of the freezing drum, 2 and such irregularities cannot in practice be corrected by the electrolytic application of a chronium plating. In connection with the invention it is an extra advantage, therefore, that the aluminum coating can be applied in a relatively thick layer, at relatively low costs, such that the coating surface can be machined for the attainment of a fully regularly shaped drum surface.

A test drum according to the invention has been in operation for more than six months with very good results. An extremely good corrosion protection of the steel drum even towards sea water as to be expected, but the mechanical stability of the aluminum coating has been very surprising in view of the fact that the yield strength of the aluminum, as mentioned, is quite close to that of ice. The stability, however, requires the aluminum to be applied by the electric arc process as distinguished from application methods based on lower application temperatures, such as the "flame spraying" method, by which the coating material is melted in a welding flame and blased upon the surface to be coated. It has been found that by such a method the coherence between the coating and the freezing drum surface is insufficient to resist the displacement forces occurring in the said scraping area, and it is of course a major condition that the thin coating is sufficiently effectively bonded to the steel drum surface.

An exact explanation why the cheap inexpensive aluminum coating is unexpectedly resistant to the ice scraping forces cannot be given at the present. It is suspected, however, that an important role is played by aluminum oxides. The aluminum as supplied to the electric arc consists of some 99.5% pure aluminum, but an analysis of the applied coating shows a content of 2-3% of aluminum oxide, which, as well known, is a very hard material. Thus, the required electric arc application method seems to be responsible not only for a good coherence between the coating and the steel drum surface, but even for the formation of aluminum oxide particles in the resulting coating to the effect that the mechanical resistivity of the coating is increased.

This has been confirmed by a close study of the test drum. Initially the drum surface was slightly worn generally, only a few micrometers, but it was observed that particles of aluminum oxide projected from the worm surface and that further wear was then stopped or widely retarded.

While the formation of aluminum oxide by the electric arc spraying process may thus increase the mechanical resistivity of the coating it is rather important that the coating is still able to be turned to the required cylindrical shape. It has been found that the oxide reinforced aluminum coating cannot easily be lathed by turning tools as conventionally prescribed for working aluminum, while it has been found perfectly possible to lathe the coating by a tool as otherwise used for the turning of ordinary steel workpieces. In this connection it is to be noted that the turning speed of the surface to be turned will be relatively low because of the normally rather large diameter of the drum surface, whereby the turning tool should be selected correspondingly.

What is claimed is:

1. A cylindrical freezing drum for a slice ice making machine of the type adapted to be supplied with a freezing medium to one side of the drum wall and water to an opposite side thereof and to cooperate with scraper means for successively scraping off the ice as produced on the drum, said drum being made of steel and provided with an exterior metallic coating, characterized in that the metallic coating is an aluminum coating applied by an electric arc spraying method.

2. A method of producing a freezing drum for slice ice making machines, whereby at least one cylindrical side of a steel drum is provided with a corrosion protective metallic coating, characterized in providing the metallic coating by applying to the drum surface a layer of aluminum by an electric arc spraying process and thereafter turning the drum surface to an accurate circular cylindrical shape.

3. A method according to claim 2, whereby the aluminum is sprayed onto the drum surface with a layer thickness of some 0.8-1 mm, which by the subsequent turning is reduced to a minimum of 0.2 1 mm.

* * * * *